(12) United States Patent
Kanegae et al.

(10) Patent No.: US 10,814,822 B2
(45) Date of Patent: Oct. 27, 2020

(54) PASSENGER PROTECTION APPARATUS FOR VEHICLE

(71) Applicant: SUBARU CORPORATION, Tokyo (JP)

(72) Inventors: Shota Kanegae, Tokyo (JP); Kazuya Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 100 days.

(21) Appl. No.: 16/170,541

(22) Filed: Oct. 25, 2018

(65) Prior Publication Data

US 2019/0241147 A1    Aug. 8, 2019

(30) Foreign Application Priority Data

Feb. 7, 2018 (JP) .................................. 2018-020257

(51) Int. Cl.
*B60R 21/2334* (2011.01)
*B60R 21/26* (2011.01)
(Continued)

(52) U.S. Cl.
CPC ........ *B60R 21/2334* (2013.01); *B60R 21/233* (2013.01); *B60R 21/237* (2013.01); *B60R 21/26* (2013.01); *B60R 2021/0048* (2013.01)

(58) Field of Classification Search
CPC ... B60R 21/203; B60R 21/205; B60R 21/231; B60R 21/233; B60R 21/2334; B60R 21/2338; B60R 21/237; B60R 2021/0006; B60R 2021/0009; B60R 2021/0023; B60R 2021/0048; B60R 2021/23308; B60R 2021/23324; B60R 2021/23332; B60R 2021/23382; B60R 21/26

See application file for complete search history.

(56) References Cited

U.S. PATENT DOCUMENTS 5,803,485 A * 9/1998 Acker ................... B60R 21/207
                                                   280/728.2
6,419,262 B1    7/2002 Fendt et al.
(Continued)

FOREIGN PATENT DOCUMENTS

DE    102007001815 A1 * 7/2008 ........... B60R 21/233
JP         47-024736 U    11/1972
(Continued)

OTHER PUBLICATIONS

Japanese Office Action dated Sep. 3, 2019 for Japanese Patent Application No. 2018-020257 (5 pages in Japanese with English Translation).

*Primary Examiner* — Laura Freedman
(74) *Attorney, Agent, or Firm* — Smith, Gambrell & Russell, LLP (57) ABSTRACT

A passenger protection apparatus for a vehicle includes an airbag and an inflator. The airbag is provided to be able to deploy around a passenger in a vehicle, and the inflator is configured to supply gas to deploy the airbag. The airbag includes a main bag configured to support a head and an upper body of the passenger bending down, and a sub bag projecting from the main bag toward a passenger side. After expanding in a direction different from the passenger side, the sub bag turns to the passenger side.

6 Claims, 5 Drawing Sheets

(51) Int. Cl.
    *B60R 21/237*     (2006.01)
    *B60R 21/233*     (2006.01)
    *B60R 21/00*     (2006.01)

(56) References Cited

U.S. PATENT DOCUMENTS

| | | | |
|---|---|---|---|
| 7,163,232 B2 * | 1/2007 | Yokoyama | B60R 21/201 |
| | | | 280/730.2 |
| 7,631,891 B2 * | 12/2009 | Washino | B60R 21/203 |
| | | | 280/731 |
| 8,678,429 B2 | 3/2014 | Nagasawa et al. | |
| 9,027,956 B2 * | 5/2015 | Yamaji | B60R 21/203 |
| | | | 280/729 |
| 9,272,684 B1 | 3/2016 | Keyser et al. | |
| 9,522,648 B2 * | 12/2016 | Fukawatase | B60R 21/233 |
| 9,561,774 B2 * | 2/2017 | Cheng | B60R 21/203 |
| 9,956,937 B2 * | 5/2018 | Jindal | B60R 21/231 |
| 10,328,884 B2 * | 6/2019 | Kobayashi | B60R 21/231 |
| 2010/0213692 A1 * | 8/2010 | Nagai | B60R 21/2346 |
| | | | 280/729 |
| 2013/0001934 A1 | 1/2013 | Nagasawa et al. | |
| 2015/0307055 A1 | 10/2015 | Cheng et al. | |
| 2017/0101071 A1 | 4/2017 | Kruse | |
| 2018/0290616 A1 | 10/2018 | Nakajima et al. | |
| 2018/0354447 A1 | 12/2018 | Nakajima et al. | |
| 2019/0291681 A1 * | 9/2019 | Nakajima | B60R 21/216 |
| 2019/0299911 A1 * | 10/2019 | Kanegae | B60R 21/233 |

FOREIGN PATENT DOCUMENTS

| | | |
|---|---|---|
| JP | 2013-014176 | 1/2013 |
| JP | 2015-093603 A | 5/2015 |
| WO | 2017-061163 A1 | 4/2017 |
| WO | 2017-090772 A1 | 6/2017 |

\* cited by examiner

PASSENGER PROTECTION APPARATUS FOR VEHICLE

The present application claims priority from Japanese Patent Application No. 2018-020257 filed on Feb. 7, 2018, the entire contents of which are hereby incorporated by reference.

BACKGROUND

1. Technical Field

The present invention relates to a passenger protection apparatus.

2. Related Art

Until now, various passenger protection apparatuses have been proposed to equalize impact values of different types of collision. There has been known a passenger protection apparatus which includes an airbag including an extension part disposed at least one edge of the airbag in the width direction of the vehicle and is expandable to extend toward the rear side of the vehicle, which is disclosed, for example, in Japanese Unexamined Patent Application Publication No. 2013-014176.

SUMMARY OF THE INVENTION

An aspect of the present invention provides a passenger protection apparatus for a vehicle including an airbag provided to be able to deploy around a passenger in a vehicle, and an inflator configured to supply gas to deploy the airbag. The airbag includes a main bag configured to support a head and an upper body of the passenger bending down, and a sub bag projecting from the main bag toward a passenger side. After expanding in a direction different from the passenger side, the sub bag turns to the passenger side.

DETAILED DESCRIPTION

Hereinafter, examples of the present invention will be described with reference to the accompanying drawings. Note that the following description is directed to illustrative examples of the disclosure and not to be construed as limiting to the technology. Factors including, without limitation, numerical values, dimensions, shapes, materials, components, positions of the components, and how the components are coupled to each other are for purposes of illustration to give an easier understanding of the technology, and are not to be construed as limiting to the technology, unless otherwise specified. Further, elements in the following examples which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the technology is omitted.

As described above, there has been known a passenger protection apparatus having a convex portion extending backward from a front airbag to absorb the impacts of different types of collision. This passenger protection apparatus can equalize impact values of different types of collision, and therefore is useful to protect the passenger from the impact of a collision. However, when the airbag deploys, the convex portion projects toward the passenger, and therefore it is required to improve the safety of the passenger taking into account the type of collision or the motion of the passenger in a collision.

It is desirable to provide a passenger protection apparatus capable of improving the safety of a passenger.

Figure 1A:
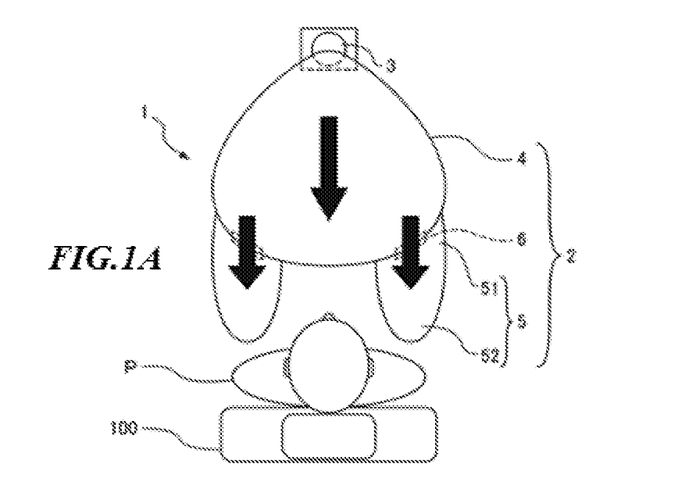
FIG. 1A and FIG. 1B are plan views schematically illustrating a passenger protection apparatus according to an example of the present invention.
Figure 1B:
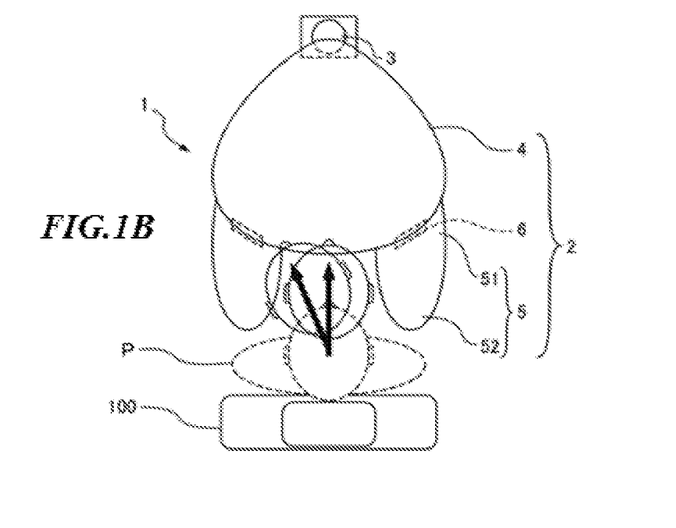
Figure 2A:
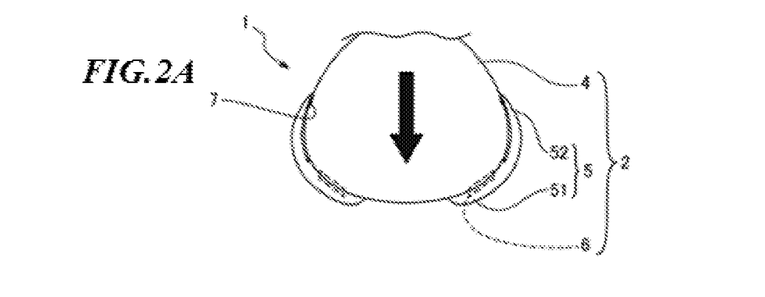
FIGS. 2A, 2B and 2C are plan views illustrating a deployment process of an airbag of the passenger protection apparatus illustrated in FIG. 1.
Figure 2B:
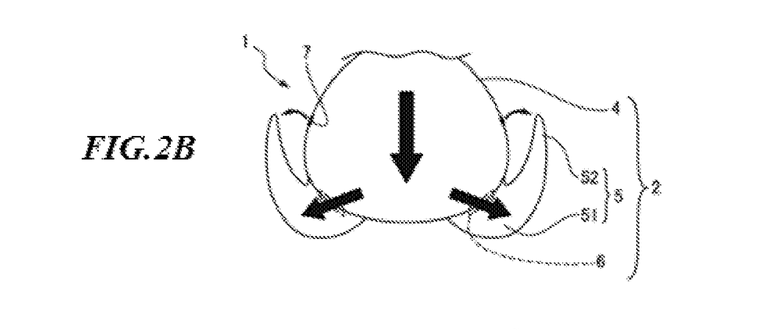
Figure 2C:
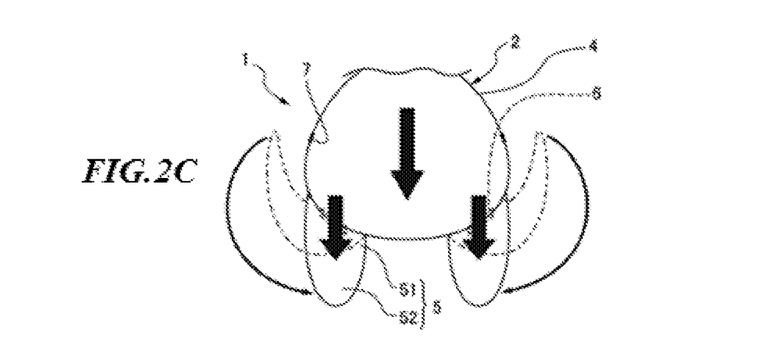

FIG. 1A and FIG. 1B are plan views schematically illustrating a passenger protection apparatus 1 according to an example of the present invention. FIGS. 2A, 2B and 2C are plan views illustrating a deployment process of an airbag 2 of the passenger protection apparatus 1 illustrated in FIGS. 1A and 1B.

As illustrated in FIG. 1A and FIG. 1B, the passenger protection apparatus 1 includes an airbag 2 and an inflator 3. The airbag 2 is provided to be able to deploy around a passenger P sitting on a seat 100. The inflator 3 injects gas into the airbag 2 by, for example, the explosion of gunpowder. The airbag 2 supplied with the gas by the inflator 3 is deployed by expanding the airbag 2 to the passenger P as indicated by black arrows in FIG. 1A.

The airbag 2 includes a main bag 4 and sub bags 5. With the present example, the airbag 2 is a front airbag configured to deploy backward in front of the passenger P as illustrated in FIGS. 1A and 1B.

The main bag 4 has a bag-shaped body configured to support the head and the upper body of the passenger 4 bending down. The main bag 4 can deploy backward from a steering wheel or an instrument panel toward the passenger P. Each of the sub bags 5 has a bag-shaped body configured to project from the main bag 4 toward the passenger P. The sub bags 5 can deploy backward toward the head of the passenger P supported by the main bag 4 on both sides of the head of the passenger P in the width direction of the vehicle. Here, with the present example, the sub bags 5 are provided on both sides of the head of the passenger P. However, this is by no means limiting, and the sub bag 5 may be provided on at least one side. Each of the sub bags 5 includes a base part 51 projecting from the rear part of the main bag 4, and a front part 52 extending backward from the base part 51 toward the passenger P.

The main bag 4 and the sub bags 5 communicate with each other via communication ports 6 provided in the rear part of the main bag 4. The gas injected from the inflator 3 into the main bag 4 can flow into the sub bags 5 via the communication ports 6. By this means, it is possible to deploy the main bag 4 and the sub bags 5 by the single inflator 3.

The airbag 2 having the main bag 4 and the sub bags 5 can absorb impacts of various types of collisions. To be more specific, as illustrated in FIG. 1B, when a frontal collision occurs, the front portion of the head of the passenger P moving forward is supported mainly by the main bag 4, and, when a lateral collision occurs, the front portion and the side portions of the head of the passenger P moving diagonally forward is supported by the main bag 4 and the sub bags 5.

However, in particular, the deployed sub bags 5 are closer to the passenger P than the deployed main bag 4. Therefore, if the sub bags 5 linearly deploy backward toward the passenger P, it is required to improve the safety of the sub bags 5 for the passenger P. FIGS. 2A-2C illustrate an example of a deployment process of the airbag 2 to solve this problem.

As illustrated in FIG. 2A, the front parts 52 of the sub bags 5 are locked by locking members 7 provided on the outer surface of the main bag 4 in the width direction of the main bag 4. To be more specific, the sub bags 5 are locked by the locking members 7 on the outer surface of the main bag 4 in the width direction of the main bag 4 when the airbag 2 is folded and stored in the steering wheel or instrument panel, and remain locked until the main bag 4 deploys to some degree. The sub bags 5 are not easier to expand than the main bag 4 because the front parts 52 of the sub bags 5 are locked. Therefore, the gas flows into the sub bags 5 at a time later than the main bag 4.

The locking members 7 are not limited as long as the locking members 7 lock the front parts 52 of the sub bags 5, and the locking state can be cancelled by applying an appropriate force. The locking state may be realized by, for example, loosely sewing the front parts 52 to the main bag 4, and attaching the front parts 52 to the main bag 4. Alternatively, the locking members 7 may be clip members fixed to the side surfaces of the main bag 4.

When the gas is further injected into the airbag 2 illustrated in FIG. 2A, the airbag 2 deploys as illustrated in FIG. 2B. To be more specific, the gas flows from the main bag 4 into the sub bags 5 via the communication ports 6. The sub bags 5 supplied with the gas expand, so that a force is applied to the front parts 52 to separate from the locking members 7 and move outward in the width direction of the main bag 4. By this means, when the inner pressure of the sub bags 5 is higher than a predetermined value to further deploy the sub bags 5, the front parts 52 locked by the locking members 7 are released as illustrated in FIG. 2B.

When the gas is further injected into the airbag 2 illustrated in FIG. 2B, the airbag 2 deploys as illustrated in FIG. 2C. To be more specific, when the front parts 52 locked by the locking members 7 are released, there is no restriction to expand the sub bags 5, and therefore the sub bags 5 can completely deploy. By this means, the gas can flow into the sub bags 5 via the communication ports 6 until the inner pressure of the main bag 4 is identical to or approximately the same as that of the sub bags 5. The front parts 52 separated from the locking members 7 turn inward in the width direction of the main bag 4. Finally, the sub bags 5 deploy backward to face the passenger P side as illustrated in FIG. 1A, which is the complete deployment of the sub bags 5.

As described above, after the front parts 52 of the sub bags 5 of the airbag 2 expand in the direction which is different from the passenger P side (expand outward but backward in the width direction of the main bag 4), the sub bags 5 turn inward in the width direction of the main bag 4 to face the passenger P side. To be more specific, the sub bags 5 deploy to turn outward once and turn inward in the width direction of the main bag 4. Accordingly, the sub bags 5 do not linearly deploy backward toward the passenger P, and therefore improve the safety of the passenger P. Here, as described above, the sub bags 5 may deploy in the direction different from the passenger P side, and eventually face the passenger P side at the completion of deployment. However, this is by no means limiting, and the sub bags 5 may completely deploy in the direction different from the passenger P side, and then may turn to face the passenger P side while maintaining the complete deployment.

Figure 3A:
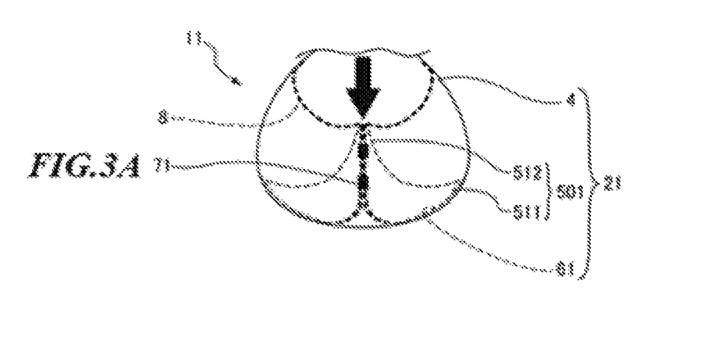
FIGS. 3A, 3B and 3C plan views illustrating a deployment process of an airbag of a passenger protection apparatus according to another example of the present invention.
Figure 3B:
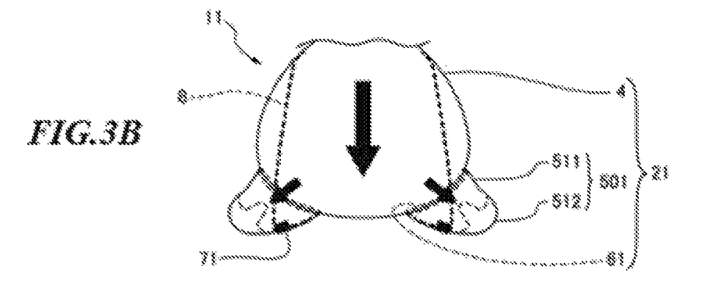
Figure 3C:
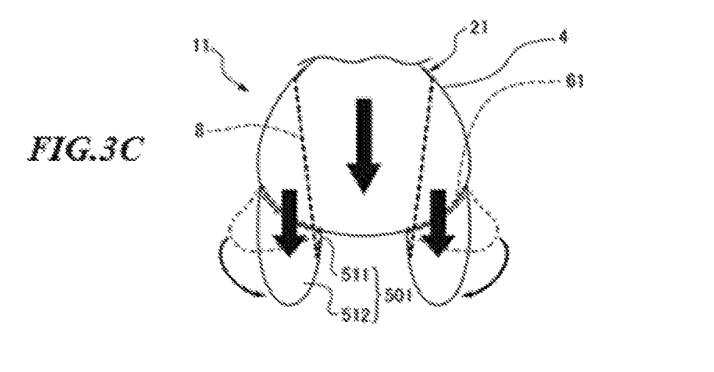
Figure 4A:
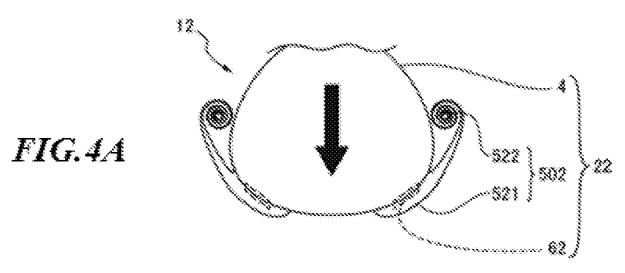
FIGS. 4A, 4B and 4C are plan views illustrating a deployment process of an airbag of a passenger protection apparatus according to another example of the present invention.
Figure 4B:
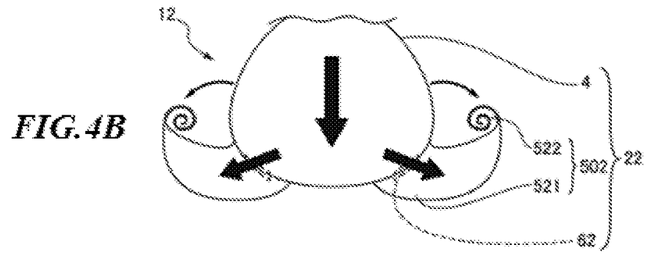
Figure 4C:
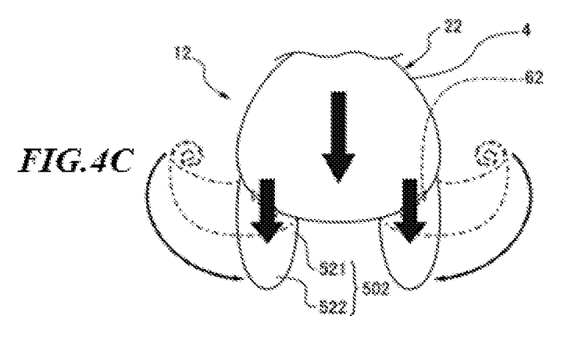
Figure 5A:
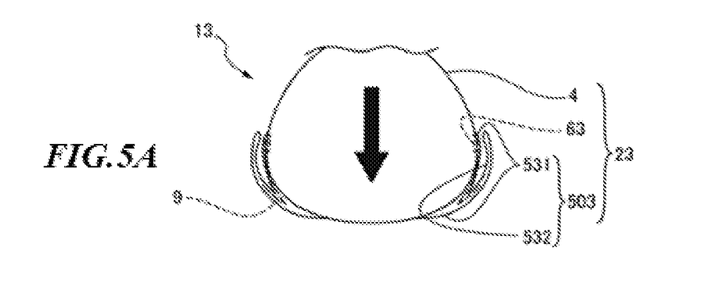
FIGS. 5A, 5B and 5C are plan views illustrating a deployment process of an airbag of a passenger protection apparatus according to another example of the present invention.
Figure 5B:
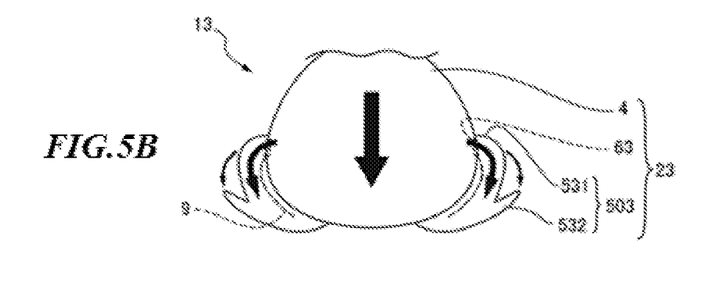
Figure 5C:
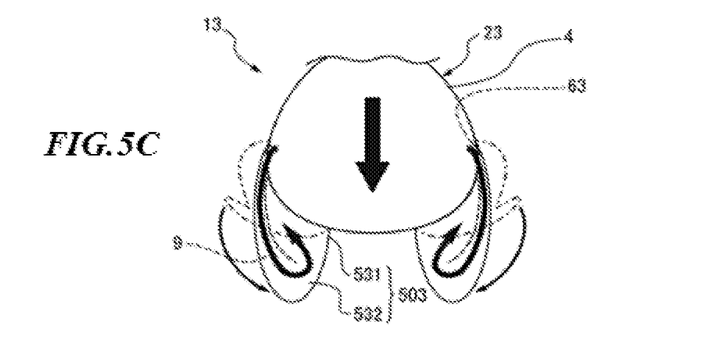

Next, other examples of deployment processes of the sub bags which improve the safety of the passenger P will be described with reference to FIGS. 3A to 5C. FIGS. 3A-3C are plan views illustrating a deployment process of an airbag 21 of a passenger protection apparatus 11 according to another example of the present invention. FIGS. 4A-4C are plan views illustrating a deployment process of an airbag 22 of a passenger protection apparatus 12 according to another example of the present invention. FIGS. 5A-5C are plan views illustrating a deployment process of an airbag 23 of a passenger protection apparatus 13 according to another example of the present invention. Here, members illustrated in FIGS. 3A to 5C which are the same as in FIGS. 1A to 2C are assigned the same reference numerals as those in FIGS. 1A to 2C and, detailed description of them will be omitted.

The airbag 21 illustrated in FIGS. 3A to 3C is different from the airbag 2 in the locking positions and the locking state of the sub bags. The airbag 21 includes sub bags 501. When deploying, the right and left sub bags 501 project to the outside of the main bag 4, and meanwhile, when being stored, the sub bags 501 are folded and locked in the main bag 4.

A pair of right and left tethers 8, which is a long member, is provided in the airbag 21. One end of each of the tethers 8 is fixed to the inner surface of the front portion of the main bag 4 by sewing, and the other end of the tether 8 is fixed to the inner surface of the main bag 4 by sewing at a position facing inward in the width direction of the main bag 4 when the sub bags 501 deploy.

The sub bags 501 are locked by a locking member 71 while the base parts 511 and front parts 512 are folded in the main bag 4, and the tethers 8 are sandwiched between the right and left sub bags 501. When the gas flows into the sub bags 501 and a force acts in a direction in which the sub bags 501 are separated from the main bag 4, the sub bags 501 locked by the locking members 71 are released, like the locking members 7. The locking members 71 lock the pair of sub bags 501 and the pair of tethers 8 together. As illustrated in FIG. 3A, the front part 512 is locked by the locking member 71 at a position more medially located than the base part 511 in the width direction of the main bag 4, that is, at an approximate center of the main bag 4 in the width direction of the main bag 4. Here, to fold the sub bags 501 in the main bag 4 and to deploy the sub bags 501, the airbag 21 illustrated in FIGS. 3A-3C includes communication ports 61 forming as coupling portions of the main bag 4 and the base parts 511.

When the gas is further injected into the airbag 21 illustrated in FIG. 3A, the airbag 21 deploys as illustrated in FIG. 3B. To be more specific, when the gas flows into the pair of sub bags 501 on the right and left sides to push the sub bags 501 out of the main bag 4, the right and left sub bags 501 locked by the locking members 71 are released. At this time, a force generated by the gas pressure is applied to the front parts 512 of the pair of right and left sub bags 501 locked at an approximate center of the main bag 4 in the width direction, so that the pair of right and left sub bags 501 separate from one another. Accordingly, the sub bags 501 deploy outward in the width direction of the main bag 4 when the sub bags 501 are pushed out of the main bag 4. As a result, when the inner pressure of the main bag 4 is increased, the sub bags 501 folded in the main bag 4 are pushed out of the main bag 4 via the communication ports 61, and expand to increase the inner volume of the sub bags 501 outside the main bag 4.

When the gas is further injected into the airbag 21 illustrated in FIG. 3B, the airbag 21 deploys as illustrated in FIG. 3C. To be more specific, the front ends 512 start to deploy outward in the width direction of the main bag 4, that is, start to emerge from the main bag 4, and then turn inward in the width direction of the main bag 4 by the tethers 8 fixed to the inner surfaces of the sub bags 501 at positions facing inward in the width direction of the main bag 4. Here, as illustrated in FIG. 3B, it is preferred that the locking members 71 lock the tethers 8 and part of the inner surfaces of the sub bags 501 when the sub bags 501 start to be pushed out of the main bag 4. By this means, the front parts 512 deploying outward can be pulled inward in the width direction of the main bag 4 by a strong force, and therefore it is possible to surely turn the sub bags 501. When or after the sub bags 501 turn, the tethers 8 and the inner surfaces of the sub bags 501 locked by the locking members 71 may be released. After that, the front parts 512 which are released from the locking state in the main bag 4 with the tethers 8 turn inward in the width direction of the main bag 4. Finally, the sub bags 501 deploy backward to face the passenger P side as illustrated in FIG. 1A, which is the complete deployment of the sub bags 501. Here, with the present example, the tethers 8 are used as auxiliary members to turn the sub bags 501.

As described above, after the front parts 512 of the sub bags 501 of the airbag 21 expand in the direction which is different from the passenger P side (expand outward but backward in the width direction of the main bag 4), the sub bags 501 turn inward in the width direction of the main bag 4 to face the passenger P side. To be more specific, the sub bags 5 deploy to turn outward once and turn inward in the width direction of the main bag 4. Accordingly, the sub bags 501 do not linearly deploy backward toward the passenger P, and therefore improve the safety of the passenger P.

The airbag 22 illustrated in FIGS. 4A-4C is different from the airbag 2 in the locking state and the state before the deployment.

As illustrated in FIG. 4A, front parts 522 of the sub bags 502 are curled inward such that portions of the sub bags 502 facing outward in the width direction of the main bag 4 during deployment turn inward, and disposed on the right and left sides of the main bag 4. With the example illustrated in FIGS. 4A-4C, the sub bags 502 are not locked on the main bag 4.

When the gas is further injected into the airbag 22 illustrated in FIG. 4A, the airbag 22 deploys as illustrated in FIG. 4B. To be more specific, when the gas flows into the sub bags 502, the curled front parts 522 start to uncurl. When the front parts 22 curled in a specified direction as illustrated in FIG. 4A are uncurled, the sub bags 502 first deploy outward in the width direction of the main bag 4.

When the gas is further injected into the airbag 22 illustrated in FIG. 4B, the airbag 22 deploys as illustrated in FIG. 4C. To be more specific, the front parts 522 first expand outward in the width direction of the main bag 4, and, as the sub bags 502 are deploying, the front parts 522 move backward to form the bottoms of the bags. That is, the front parts 522 turn outward, and then inward in the width direction of the main bag 4 to deploy the sub bags 502. After that, the uncurled front parts 522 turn inward in the width direction of the main bag 4. Finally, the sub bags 502 deploy backward to face the passenger P side as illustrated in FIG. 1A, which is the complete deployment of the sub bags 502.

As described above, after the front parts 522 of the sub bags 502 of the airbag 22 expand in the direction which is different from the passenger P side (expand outward but backward in the width direction of the main bag 4), the sub bags 502 turn inward in the width direction of the main bag 4 to face the passenger P side. To be more specific, the sub bags 502 deploy to turn outward once and turn inward in the width direction of the main bag 4. Accordingly, the sub bags 502 do not linearly deploy backward toward the passenger P, and therefore improve the safety of the passenger P.

The airbag 23 illustrated in FIGS. 5A-5C is different from the airbag 2 in the shape of the sub bags and the arrangement of the communication ports.

With an example illustrated in FIGS. 5A-5C, base parts 531 disposed along the sides from the rear part of the main bag 4 project, and communication ports 63 are formed along the sides of the main bag 4. Moreover, as illustrated in FIG. 5B and FIG. 5C, partition members 9 are fixed in the sub bags 503 across the base parts 531 and front parts 532. As illustrated in FIG. 5A, before the sub bags 503 deploy, the front parts 532 are folded and disposed on the right and left sides of the main bag 4. With the example illustrated in FIGS. 5A-5C, the sub bags 503 are not locked on the main bag 4.

When the gas is further injected into the airbag 23 illustrated in FIG. 5A, the airbag 23 deploys as illustrated in FIG. 5B. To be more specific, when the gas flows into the sub bags 503, the sub bags 503 start to deploy in positions near the communication ports 63 on the sides of the main bag 4. That is, the sub bags 503 first deploy outward in the width direction of the main bag 4.

When the sub bags 503 deploy, the partition members 9 are located across the base parts 531 and the front parts 532, that is, located in an approximate front-to-back direction. As illustrated in FIG. 5B, one end of the partition member 9 in the base part 531 side is fixed to the side of the main bag 4 and located behind the communication port 63 so that the partition member 9 is closer to the passenger P than the communication port 63. The partition members 9 form flow paths of the gas in the sub bags 503. At the beginning, the sub bags 503 deploy outward in the width direction of the main bag 4 as illustrated in FIG. 5B.

Then, the gas is further injected into the airbag 23 illustrated in FIG. 5B, the airbag 23 deploys as illustrated in FIG. 5C. To be more specific, the sub bags 503 first deploy outward in the width direction of the main bag 4, and the flow paths of the gas formed by the partition members 9 gradually deploy as the gas is flowing into the sub bags 503. That is, the sub bags 503 sequentially deploy as follows: the base parts 531 first deploy as illustrated in FIG. 5B; and the front parts 532 deploy, and then portions of the base parts 531 which are located inside the partition members 9 in the width direction of the main bag 4 deploy as illustrated in FIG. 5C. Accordingly, the sub bags 503 deploy outward and then inward in the width direction of the main bag 503. The sub bags 503 supplied with the gas from the sides of the main bags 4 deploy inward in the width direction of the main bag 4. Finally, the sub bags 503 deploy backward to face the passenger P side as illustrated in FIG. 1A, which is the complete deployment of the sub bags 503.

As described above, the base parts 531 of the sub bags 503 of the airbag 23 expand in the direction which is different from the passenger P side (expand outward but backward in the width direction of the main bag 4), and then the front parts 532 deploy, so that the sub bags 503 turn inward in the width direction of the main bag 4 to face the passenger P side. To be more specific, the sub bags 503 deploy to turn outward once and turn inward in the width direction of the main bag 4. Accordingly, the sub bags 502 do not linearly deploy backward toward the passenger P, and therefore improve the safety of the passenger P.

Here, the partition members 9 illustrated in FIGS. 5A-5C are not necessarily required depending on the arrangement of the sub bags 503. To be more specific, the front parts 532 or portions around the front parts 532 extending backward from the base parts 531 are sawn on the rear part of the main bag 4. By this means, the sub bags 503 are folded in the main bag 4 at the projecting portions toward the passenger P to form the flow paths of the gas in the same way as when the partition members 9 are provided. In this case, the sub bags 503 first expand outward in the width direction of the main bag 4 from the sides of the main bag 4, and then deploy toward the passenger P. Therefore, it is possible to improve the safety of the passenger when the airbags 503 deploy.

With the above-described examples, it is possible to improve the safety of the passenger when the sub bags deploy. Here, with the above-described examples, the front airbag deploying backward in front of the passenger has been described. However, this is by no means limiting. The present invention is applicable to a curtain airbag, a side airbag, a far side airbag, and any airbag which will be developed in the future as long as they include sub bags deploying toward the passenger.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A passenger protection apparatus for a vehicle comprising:
   an airbag provided to be able to deploy around a passenger in the vehicle; and
   an inflator configured to supply gas to deploy the airbag, the airbag comprising:
      a main bag configured to support a head and an upper body of the passenger bending down; and
      a sub bag projecting from the main bag toward a passenger side,
   wherein the sub bag is configured such that after expanding in a direction out away from the passenger side, the sub bag turns to the passenger side, and wherein:
      the main bag is configured to deploy in front of the passenger;
      the sub bag is configured to deploy backward toward the head of the passenger supported by the main bag on at least one side of the passenger in a width direction of the vehicle; and
      the sub bag is configured such that after expanding outward in the width direction of the main bag, the sub bag turns inward in the width direction of the main bag, and wherein the sub bag has a base part projecting from a rear part of the main bag and a front part extending backward toward the passenger, and wherein the sub bag is configured such that, when the main bag deploys before the sub bag deploys, the front part is locked on an outer surface of the main bag more forward than the base part, and wherein the sub bag is further configured such that, when the airbag deploys, the locked front part is released.

2. The passenger protection apparatus according to claim 1, wherein the sub bag is configured as to initially extend in a forward direction and then become redirected during further deployment as to extend in a rearward direction.

3. The passenger protection apparatus according to claim 2, wherein the sub bag has an edge surface that is joined to the main bag, and which edge surface provides a turn location for the sub bag as it is redirected during deployment from the forward direction to the backward direction.

4. The passenger protection apparatus according to claim 1, wherein the main bag has an exterior region that is exposed for direct passenger contact.

5. A passenger protection apparatus for a vehicle comprising:
   an airbag provided to be able to deploy around a passenger in the vehicle; and
   an inflator configured to supply gas to deploy the airbag, the airbag comprising:
      a main bag configured to support a head and an upper body of the passenger bending down; and
      a sub bag projecting from the main bag toward a passenger side,
   wherein the sub bag is configured such that after expanding in a direction out away from the passenger side, the sub bag turns to the passenger side, and wherein:
      the main bag is configured to deploy in front of the passenger;
      the sub bag is configured to deploy backward toward the head of the passenger supported by the main bag on at least one side of the passenger in a width direction of the vehicle; and
      the sub bag is configured such that after expanding outward in the width direction of the main bag, the sub bag turns inward in the width direction of the main bag, and wherein the sub bag has a base part projecting from a rear part of the main bag and a front part extending backward toward the passenger, and wherein the sub bag is further configured such that, before the sub bag deploys, the front part is locked in the main bag at a position more medially located than the base part in the width direction of the main bag and, when the airbag deploys, the locked front part is released.

6. A passenger protection apparatus for a vehicle comprising:
   an airbag provided to be able to deploy around a passenger in the vehicle; and
   an inflator configured to supply gas to deploy the airbag, the airbag comprising:
      a main bag configured to support a head and an upper body of the passenger bending down; and
      a sub bag projecting from the main bag toward a passenger side,
   wherein the sub bag is configured such that after expanding in a direction out away from the passenger side, the sub bag turns to the passenger side, and wherein:
      the main bag is configured to deploy in front of the passenger;

the sub bag is configured to deploy backward toward the head of the passenger supported by the main bag on at least one side of the passenger in a width direction of the vehicle; and the sub bag is configured such that after expanding outward in the width direction of the main bag, the sub bag turns inward in the width direction of the main bag, and wherein the sub bag has a base part projecting from a rear part of the main bag and a front part extending backward toward the passenger, and wherein the sub bag is configured such that, before the sub bag deploys, the front part is curled inward such that a portion of the sub bag facing outward in the width direction of the main bag during deployment turns inward, and wherein the sub bag is further configured such that, when the airbag deploys, the front part deploys as being uncurled.

* * * * *